(12) United States Patent
Takahashi

(10) Patent No.: US 8,075,029 B2  
(45) Date of Patent: Dec. 13, 2011

(54) VEHICULAR FRONT BUMPER STRUCTURE

(75) Inventor: Hiroyuki Takahashi, Aichi (JP)

(73) Assignee: Toyota Jidosha Kabushiki Kaisha, Toyota-shi, AIchi-ken (JP)

( * ) Notice: Subject to any disclaimer, the term of this patent is extended or adjusted under 35 U.S.C. 154(b) by 325 days.

(21) Appl. No.: 11/991,386

(22) PCT Filed: Aug. 30, 2006

(86) PCT No.: PCT/JP2006/317121  
§ 371 (c)(1),  
(2), (4) Date: Mar. 4, 2008

(87) PCT Pub. No.: WO2007/029583  
PCT Pub. Date: Mar. 15, 2007

(65) Prior Publication Data  
US 2009/0108598 A1    Apr. 30, 2009

(30) Foreign Application Priority Data  
Sep. 6, 2005   (JP) .................................. 2005-258283

(51) Int. Cl.  
*B60R 19/02*   (2006.01)

(52) U.S. Cl. ............................................. 293/4; 293/121

(58) Field of Classification Search ............ 296/193.09, 296/187.09, 187.04; 293/4, 38, 120, 132, 293/133, 154, 155, 109, 110, 121; 280/735; 180/274; *B60R 19/02*  
See application file for complete search history.

(56) References Cited

U.S. PATENT DOCUMENTS

| | | | | |
|---|---|---|---|---|
| 3,853,199 | A * | 12/1974 | Hirashima et al. ............ | 180/274 |
| 6,329,910 | B1 * | 12/2001 | Farrington .................... | 340/436 |
| 6,559,763 | B2 * | 5/2003 | Murphy et al. ............... | 340/436 |
| 6,802,556 | B2 * | 10/2004 | Mattsson et al. ......... | 296/187.09 |
| 7,137,472 | B2 * | 11/2006 | Aoki ............................ | 180/274 |

(Continued)

FOREIGN PATENT DOCUMENTS

DE    103 40 263    4/2005

(Continued)

OTHER PUBLICATIONS

International Search Report.

(Continued)

*Primary Examiner* — Glenn Dayoan  
*Assistant Examiner* — Sunsurraye Westbrook  
(74) *Attorney, Agent, or Firm* — Finnegan, Henderson, Farabow, Garrett & Dunner, LLP

(57) ABSTRACT

In a vehicular front bumper structure having the function of detecting the collision of an object against the front bumper of a vehicle in the vehicle, the length of a front bumper area in widthwise directions of the vehicle, in which area a load applied to the front bumper is detected with a collision detection sensor (104), is more than or equal to a maximum distance in the widthwise directions of the vehicle between the right and left front pillars (A pillars; 107) of the vehicle, the collision detection sensor being provided to extend along a bumper reinforce (103) between the bumper reinforce and a shock absorber (105), the bumper reinforce and the shock absorber forming the front bumper; and the collision detection sensor has an interface part (106) provided at one of the ends of the collision detection sensor in the widthwise directions of the vehicle which one is on the side opposite to a walkway (a right front end in left-hand traffic/a left front end in right-hand traffic).

15 Claims, 9 Drawing Sheets

U.S. PATENT DOCUMENTS

| | | | |
|---|---|---|---|
| 2002/0039065 A1* | 4/2002 | Hsiang | 340/435 |
| 2004/0186643 A1* | 9/2004 | Tanaka et al. | 701/45 |
| 2004/0210367 A1* | 10/2004 | Takafuji et al. | 701/45 |

FOREIGN PATENT DOCUMENTS

| | | |
|---|---|---|
| EP | 1 281 582 | 2/2003 |
| EP | 1 703 250 | 9/2006 |
| GB | 2 396 942 | 7/2004 |
| JP | 64-39600 | 3/1989 |
| JP | 5-116592 | 5/1993 |
| JP | 6-27375 | 4/1994 |
| JP | 6-72132 | 10/1994 |
| JP | 7-61298 | 3/1995 |
| JP | 7-108903 | 4/1995 |
| JP | 8-91170 | 4/1996 |
| JP | 2856058 | 11/1998 |
| JP | 2888116 | 2/1999 |
| JP | 2000-65654 | 3/2000 |
| JP | 2000-264142 | 9/2000 |
| JP | 2003-276531 | 10/2003 |
| JP | 2004-191136 | 7/2004 |
| JP | 2004-268627 | 9/2004 |
| JP | 2004-345545 | 12/2004 |
| JP | 2005-35422 | 2/2005 |
| JP | 2005-53273 | 3/2005 |
| JP | 2005-156528 | 6/2005 |
| JP | 2005-186677 | 7/2005 |
| JP | 2005-263038 | 9/2005 |
| JP | 2006-281989 | 10/2006 |
| LU | 90946 | 8/2002 |
| WO | WO 2004/058545 | 7/2004 |
| WO | WO 2005/061284 | 7/2005 |

OTHER PUBLICATIONS

Extended European Search Report dated Mar. 11, 2009.
Chinese Office Action for Application No. 200680032681.3, dated Feb. 5, 2010.
Office Action from the Japanese Patent Office for JP 2008-294104 dated Jul. 27, 2010.

* cited by examiner

VEHICULAR FRONT BUMPER STRUCTURE

TECHNICAL FIELD

The present invention relates generally to vehicular front bumper structures having the function of detecting the collision of an object against the front bumper of the vehicle in the vehicle, and more particularly to a vehicular front bumper structure that appropriately combines collision detection and durability.

BACKGROUND ART

Conventionally, a vehicular front bumper structure with the function of detecting the collision of an object is known. (For example, see Patent Documents 1 through 5).

Patent Document 1 discloses a pedestrian collision detection sensor provided in the most forward projecting part of a front bumper provided at the front end part of the body of a vehicle, and formed of a touch sensor whose contacts are closed when compressed by a collision load applied from the front.

Patent Document 2 discloses a pedestrian collision detection sensor embedded in the front of a front bumper and formed of a touch sensor.

Patent Document 3 discloses a pedestrian collision detection sensor provided to extend laterally on a front bumper and formed of a tape-shaped pressure-sensitive variable resistor (pressure-sensitive film).

Patent Document 4 discloses a pedestrian collision detection sensor attached to a bumper incorporated in the front end part of the body of a vehicle, and formed of an elongated displacement sensor or load sensor substantially as long as the bumper.

Patent Document 5 discloses a pedestrian collision detection sensor provided inside a front bumper and formed of a touch sensor having a strip shape along the longitudinal directions of the front bumper.

[Patent Document 1] Japanese Laid-Open Patent Application No. 7-108903
[Patent Document 2] Japanese Laid-Open Patent Application No. 8-91170
[Patent Document 3] Japanese Laid-Open Patent Application No. 2004-191136
[Patent Document 4] Japanese Laid-Open Patent Application No. 2005-35422
[Patent Document 5] Japanese Laid-Open Patent Application No. 2005-53273

DISCLOSURE OF THE INVENTION

Problems to Be Solved By the Invention

However, in the conventional front bumper structures with a collision detection function as described above, no attention is paid to the length of the sensor detecting the collision of the vehicle and a pedestrian in the widthwise directions of the vehicle, so that no consideration is given to how much is an appropriate length.

For example, if the collision detection sensor is relatively short in the widthwise directions of the vehicle with respect to the overall width of the vehicle, the collision of a pedestrian against the front bumper may not be detected where the collision detection sensor is not provided in the widthwise directions of the vehicle.

On the other hand, for example, if the collision detection sensor is long enough in the widthwise directions of the vehicle to have substantially the same length as the overall width of the vehicle, a slight collision such as only slightly hitting or scratching a corner of the front bumper against an object such as a wall or a guardrail may cause damage to the built-in collision detection sensor (in particular, an interface part connecting a sensor part and a circuit), thus resulting in a failure of the collision detection function.

Thus, the length of the collision detection sensor in the widthwise directions of the vehicle is not a mere design requirement and should be appropriately determined. Further, in particular, the interface part of the collision detection sensor should adopt a durable structure that is not damaged by a slight collision.

The present invention is for solving these problems, and has a main object of providing a front bumper structure for a vehicle that appropriately combines collision detection and durability.

Means for Solving the Problems

A mode of the present invention for achieving the above-described object is a vehicular front bumper structure having the function of detecting the collision of an object against the front bumper of a vehicle in the vehicle, wherein the length of a front bumper area in widthwise directions of the vehicle, in which area a load applied to the front bumper is detected with a collision detection sensor (for example, a load sensor or a displacement sensor), is more than or equal to a maximum distance in the widthwise directions of the vehicle between the right and left front pillars (A pillars) of the vehicle, the collision detection sensor being provided to extend along a bumper reinforce between the bumper reinforce and a shock absorber (for example, a foam material), the bumper reinforce and the shock absorber forming the front bumper.

In this mode, the collision detection sensor may have an interface part 1) provided at one of the ends of the collision detection sensor in the widthwise directions of the vehicle which one is on the side opposite to a walkway, where the probability of a collision with a pedestrian is believed to be relatively low (a right front end in the case of left-hand traffic as in Japan or a left front end in the case of right-hand traffic), or 2) attached to a surface of the bumper reinforce other than the front surface thereof in the front-rear directions of the vehicle (such as the rear surface in the front-rear directions of the vehicle or the upper/lower surface).

Here, in the above-described case 1), in order to extend a collision detectable area on the walkway side, the bumper reinforce and the collision detection sensor may have their respective walkway-side ends extending more toward the outer side of the vehicle than their respective ends on the side opposite to the walkway in the widthwise directions of the vehicle.

According to this mode, at least a collision against the front bumper that can incur a secondary collision with the front pillars (A pillars) can be detected in view of the fact that when a pedestrian collides with the front bumper, the pedestrian that has collided is brought down in the direction opposite to the running direction of the vehicle. This makes it possible to make an early response with certainty, such as causing a device for reducing the impact of the secondary collision known to a person having ordinary skill in the art to operate, for example, causing an airbag to deploy.

Further, according to this mode, the collision detection sensor may have any length in the widthwise directions of the vehicle as long as the length of the front bumper area in widthwise directions of the vehicle, in which area a load applied to the front bumper is detected with the collision detection sensor, is more than or equal to a maximum distance between the right and left front pillars of the vehicle in the widthwise directions of the vehicle. Therefore, the length of the collision detection sensor can be determined appropriately in accordance with the characteristic of each vehicle, such as the shape of the front bumper, so that the collision detection sensor (in particular, the interface part) is not damaged by a slight collision with the front bumper.

Therefore, according to this mode, it is possible to appropriately combine detection of a collision whose detection is much needed to be ensured in order to reducing the impact due to a secondary collision and the durability of the collision detection function.

In this mode, the shock absorber may be shaped so that the length in the widthwise directions of the vehicle of its front surface in the front-rear directions of the vehicle may be longer than the length of the collision detection sensor in the widthwise directions of the vehicle in order to ensure a sufficient length of the front bumper area, where a collision is detectable, in the widthwise directions of the vehicle while further reducing the length of the collision detection sensor in the widthwise directions of the vehicle in consideration of the durability of the collision detection sensor.

Further, in this mode, first load transmission means for transmitting, to the shock absorber, a load applied to an area where the shock absorber is not provided in the widthwise directions of the vehicle in the bumper cover of the front bumper may be provided in order to ensure a sufficient length of the front bumper area, where a collision is detectable, in the widthwise directions of the vehicle while further reducing the length of the collision detection sensor in the widthwise directions of the vehicle in consideration of the durability of the collision detection sensor.

Here, the first load transmission means a) may be implemented by increasing the rigidity of a part of the bumper cover which part is selected so that a portion of the part is in contact with the shock absorber and the remaining portion of the part is out of contact with the shock absorber, or b) implemented by attaching a highly rigid plate member between the inner side of the bumper cover and the front surface of the shock absorber in front-rear directions of the vehicle so that a part of the highly rigid plate member is in contact with the shock absorber and the remaining part of the highly rigid plate member is out of contact with the shock absorber.

Further, in this mode, in order to ensure a sufficient length of the front bumper area, where a collision is detectable, in the widthwise directions of the vehicle while further reducing the length of the collision detection sensor in the widthwise directions of the vehicle in consideration of the durability of the collision detection sensor, it is preferable that second load transmission means for transmitting, to the collision detection sensor, a load applied to an area where the bumper reinforce and the collision detection sensor are not provided in the widthwise directions of the vehicle in the shock absorber be provided when the shock absorber is extended to cover a range longer than a range where the bumper reinforce and the collision detection sensor extend in the widthwise directions of the vehicle.

Here, the second load transmission means is implemented by, for example, a lever member swingably attached to the bumper reinforce so as to transmit the displacement of a part of the shock absorber to the collision detection sensor, the part being out of contact with the collision detection sensor.

Effects of the Invention

According to the present invention, it is possible to provide a front bumper structure for a vehicle that appropriately combines collision detection and durability.

DESCRIPTION OF REFERENCE NUMERALS

Figure 1:
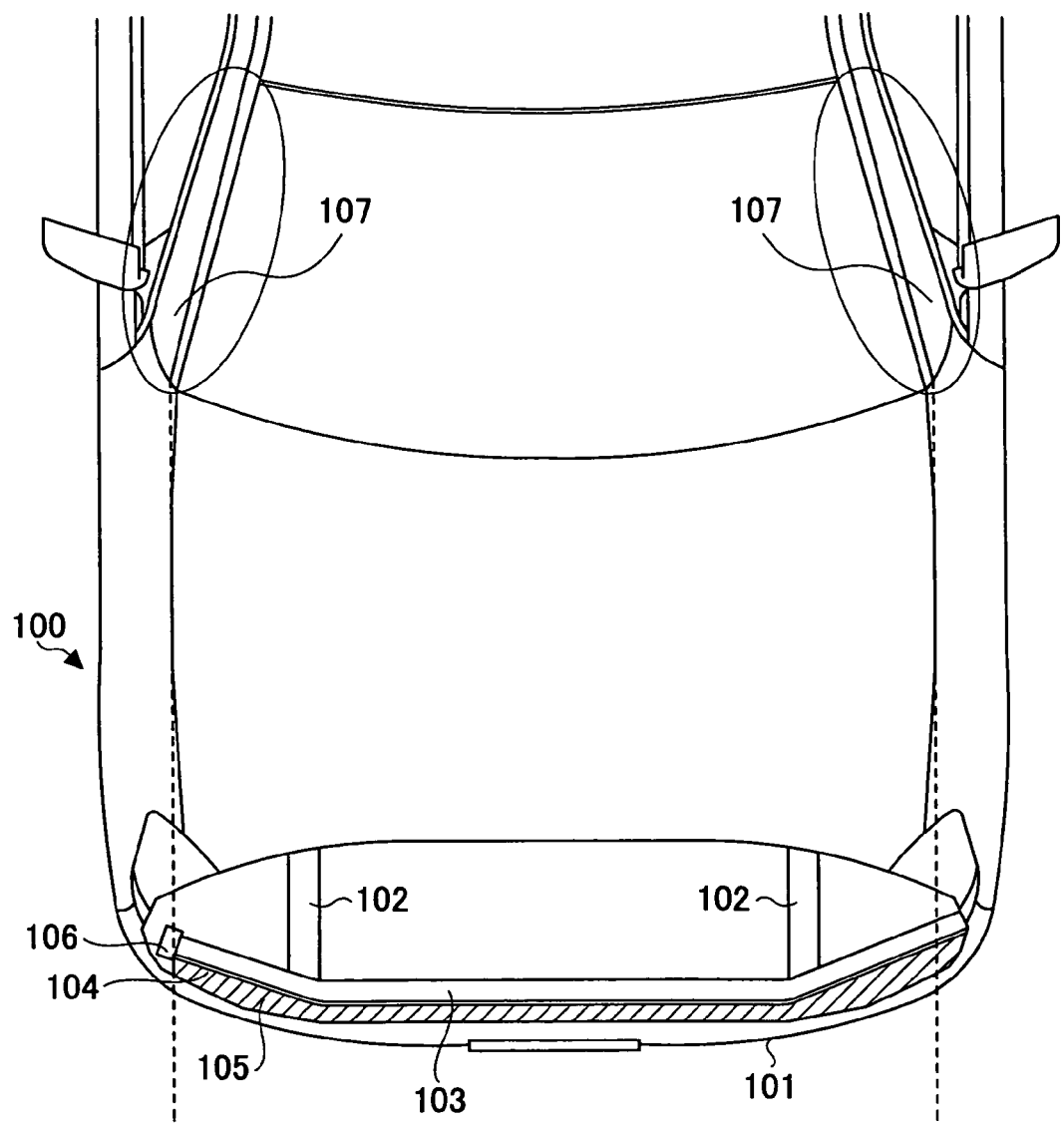
FIG. 1 is a schematic diagram of a front part of a vehicle that adopts a front bumper structure according to an embodiment of the present invention.

100 Vehicle
101 Bumper cover
102 Side member
103 Bumper reinforce
104, 104a, 104b, 104c Collision detection sensor
105 Shock absorber
106 Sensor interface
107 Front pillar (A pillar)

BEST MODE FOR CARRYING OUT THE INVENTION

A description is given below, with reference to the accompanying drawings, of the best mode for carrying out the present invention by giving embodiments. The collision detection sensor, the basic concept of its collision detection, its principal hardware configuration, its working principle, and its basic control method are known to a person having ordinary skill in the art, and accordingly, a detailed description thereof is omitted.

Embodiments

A description is given below, using FIGS. 1 and 2, of a front bumper structure for a vehicle according to one embodiment of the present invention. Here, it is assumed that a vehicle is driven on the left-hand side of the road as in Japan.

FIG. 1 is a schematic diagram of a front part of a vehicle 100 that adopts a front bumper structure according to this embodiment. FIG. 2 is a partial enlarged view enlarging a right front part of the vehicle of FIG. 1.

The front bumper structure according to this embodiment includes a bumper cover 101 that covers the entire structure and a bumper reinforce 103 attached to side members 102 of the vehicle 100.

The front bumper structure according to this embodiment further includes a collision detection sensor 104 attached to the front surface of the bumper reinforce 103 in the front-rear directions of the vehicle. In a specific example shown in FIG. 1, the collision detection sensor 104 is, for example, a load sensor using an optical fiber that detects a load applied to the sensor 104 itself. In such a load sensor, an optical fiber is provided where sensing is desired to be performed, and a light signal is caused to flow through it. When a load is imposed on the optical fiber itself so that the optical fiber is deformed, light is reflected in the fiber where it is deformed, so that the intensity of the light signal is reduced on the receiver side. The size of the load applied to the optical fiber can be understood from the size of this reduction.

The front bumper structure according to this embodiment further includes a shock absorber 105 that is formed of, for example, a foam material and absorbs an applied impact. The shock absorber 105 is provided between the collision detection sensor 104 and the front bumper cover 101 so as to be attached to the bumper reinforce 103 with the collision detection sensor 104 in between.

The front bumper structure according to this embodiment further includes an interface 106 of the collision detection sensor 104. The sensor interface 106 serves to transmit the output of the collision detection sensor 104 to an external circuit (not graphically represented). Further, compared with the collision detection sensor 104, the sensor interface 106 has relatively low durability against a load applied when an impact applied to the front bumper is transmitted. Therefore, the sensor interface 106 is provided on the side opposite to the walkway, where it is believed that a slight collision such as only slightly scratching a corner of the front bumper is relatively less likely to occur, so as to prevent the sensor interface 106 from being damaged by such a slight collision. Here, since left-hand traffic is assumed, the sensor interface 106 is provided at the end of the collision detection sensor 104 on the right side of the vehicle in FIGS. 1 and 2.

In the vehicular front bumper structure having such a structure, when an object collides with the front bumper, the impact of the collision applied to the bumper cover 101 is transmitted from the bumper cover 101 to the shock absorber 105 and then transmitted from the shock absorber 105 to the collision detection sensor 104, so that the size of the load is detected in the collision detection sensor 104.

By the way, as already known in this field, for example, a technique such as causing a pedestrian airbag to deploy has been proposed as a pedestrian protective device for reducing the impact of the secondary collision of a pedestrian, who has collided with the front bumper, with front pillars (A pillars) 107 having high rigidity.

In order to cause such a device to properly operate without delay, of the collisions of pedestrians and the front bumper, in particular, the (primary) collisions that can cause a secondary collision with the front pillars 107 should be detected without fail. Therefore, the length of the collision detection sensor 104 in the widthwise directions of the vehicle should be determined in consideration of the length of the front pillars 107 in the widthwise directions of the vehicle.

Specifically, the length of the collision detection sensor 104 according to this embodiment in the widthwise direction of the vehicle is more than or equal to a maximum distance between the right and left front pillars 107 in the widthwise directions of the vehicle (hereinafter referred to as "front pillar width" for convenience).

Usually, there are extremely great differences in speed between pedestrians and vehicles. Accordingly, it is believed that in many cases, a pedestrian who has collided with the front bumper of a vehicle is seen from the vehicle to move in the direction opposite to the running direction of the vehicle after the collision.

Based on this consideration, it can be determined that if a primary collision occurs within the range of the front pillar width on the front bumper corresponding to the front pillar width directly extended parallel to the front-rear directions of the vehicle to the front bumper, the object that has collided has a relatively strong likelihood of having a secondary collision with the front pillars 107 compared with primary collisions at other points on the front bumper.

Accordingly, of the collisions of pedestrians and the front bumper, those having the likelihood of a second collision with the front pillars 107 can be detected without omission by determining at least the range of the front pillar width in the length of the front bumper in the widthwise directions of the vehicle as a sensor installation range where a collision is detectable.

Usually, the lateral distance between the front pillars 107 is wider as it is closer to the hood (bonnet) and is narrower as it is closer to the roof as shown in FIG. 1. Therefore, in general, the distance between the right and left front pillars 107 is maximized at a point of contact with the hood. That is, in this embodiment, the front pillar width is generally equal to the distance in the widthwise directions of the vehicle between the points of contact of the right and left front pillars 107 with the hood (bonnet).

On the other hand, in the case shown in FIG. 1, it is desired that the interface 106 provided at the end of the collision detection sensor 104 on the right side of the vehicle be as distant from the corner part of the front bumper as possible so as not to be broken by a slight collision as described above.

Therefore, in the front bumper structure according to this embodiment, the length of the collision detection sensor 104 in the widthwise direction of the vehicle is equal (or substantially equal) to the front pillar width as shown in FIG. 1 so as to be more than or equal to the front pillar width as described above and as short as possible.

The length of the collision detection sensor 104 in the widthwise directions of the vehicle may be any value as long as it is more than or equal to the front pillar width, and does not have to be equal (or substantially equal) to the front pillar width as shown in FIG. 1. Accordingly, the length of the collision detection sensor 104 in the widthwise directions of the vehicle may be longer than in the case shown in FIG. 1 in consideration of the shape of the front bumper cover 101 or the durability of the sensor interface 106.

In particular, the end of the collision detection sensor 104 on the walkway side where the sensor interface 106 is not provided may extend more toward the outer side of the vehicle than the end on the side opposite to the walkway so as to extend the area where a collision is detectable.

The length of the shock absorber 105 in the widthwise directions of the vehicle is also more than or equal to the front pillar width in accordance with the length of the collision detection sensor 104 in the widthwise directions of the vehicle thus determined. As described above, a load is transmitted to the collision detection sensor 104 via the shock absorber 105. Accordingly, by adjusting the length of not only the collision detection sensor 104 but also the shock absorber 105 in the widthwise directions of the vehicle to the front pillar width as shown in the partial enlarged view of FIG. 2, a load due to a collision that occurs within the range of the front pillar width on the front bumper cover 101 is transmitted to the collision detection sensor 104 through the shock absorber 105, so that the collision is detected.

Thus, according to this embodiment, detection of a collision against the front bumper that can cause a secondary collision against the front pillars is ensured by making the length of the collision detection sensor in the widthwise directions of the vehicle be more than or equal to the front pillar width. Further, in particular, the interface part of the collision detection sensor is placed with consideration so as not to be broken by a slight collision. Therefore, it is possible to appropriately combine collision detection and durability in the vehicular front bumper structure.

Figure 2:
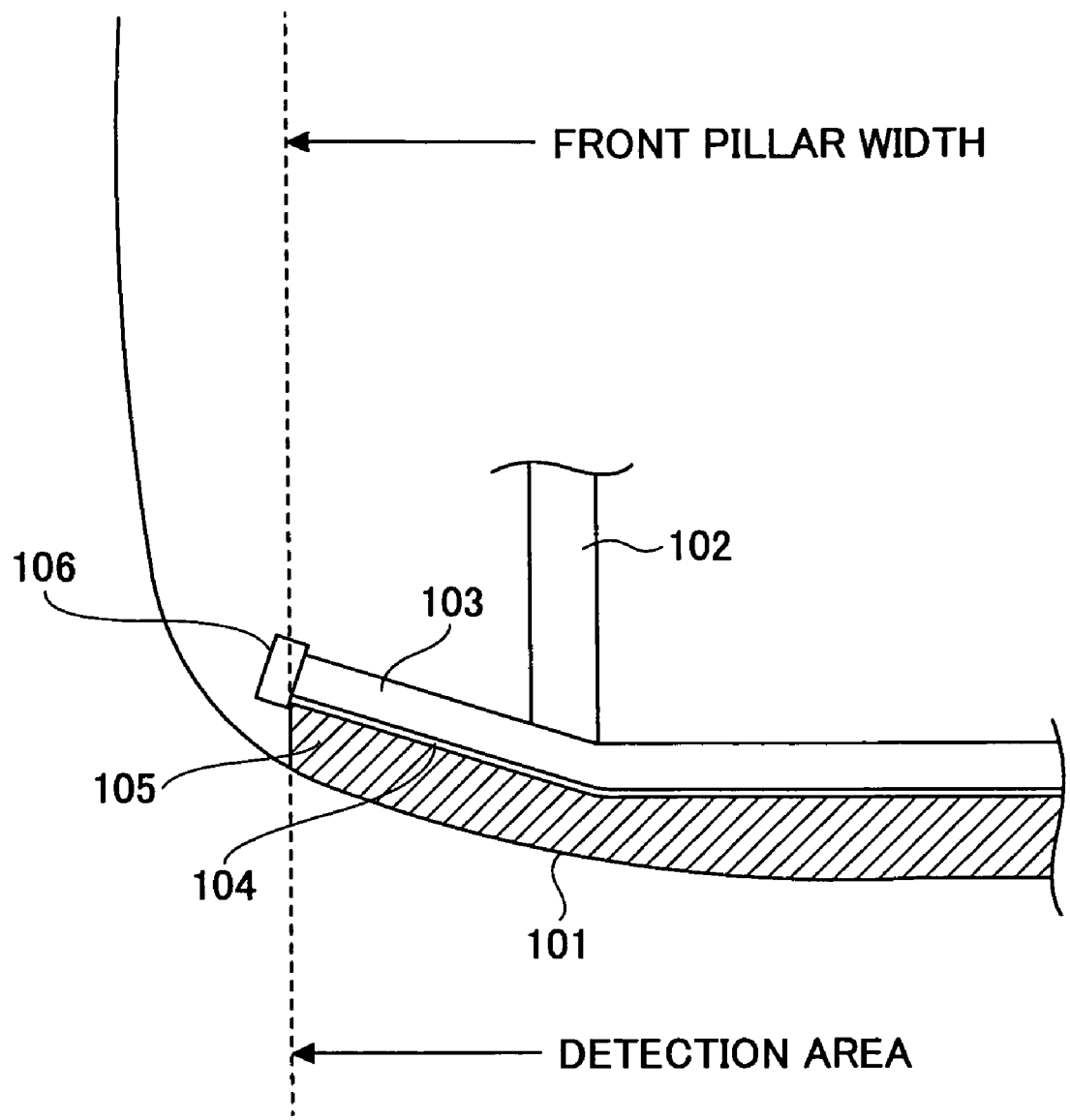
FIG. 2 is a partial enlarged view of FIG. 1, showing the details of the front bumper structure according to the embodiment of the present invention.

The details of the vehicular front bumper structure according to the above-described embodiment shown in FIGS. 1 and 2 are a mere specific example of the vehicular front bumper structure according to the present invention, and other configurations, structures, and placements are also adoptable. A description is given below of some other embodiments of the front bumper structure according to the present invention. The same characters as those of FIGS. 1 and 2 refer to the same elements, and a redundant description thereof is omitted.

Figure 3:
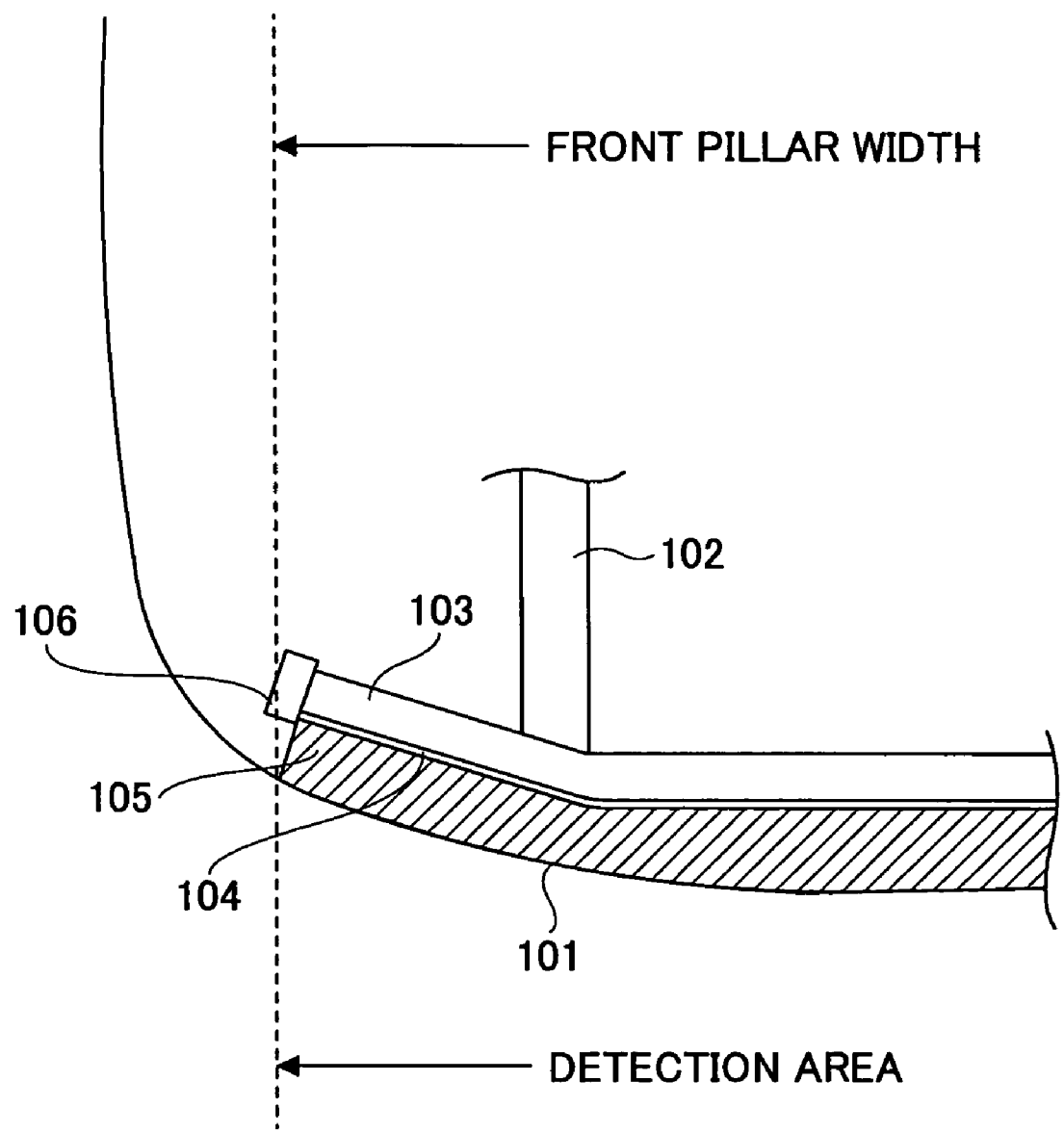
FIG. 3 is a partial enlarged view showing the details of a front bumper structure according to another embodiment of the present invention.
Figure 4:
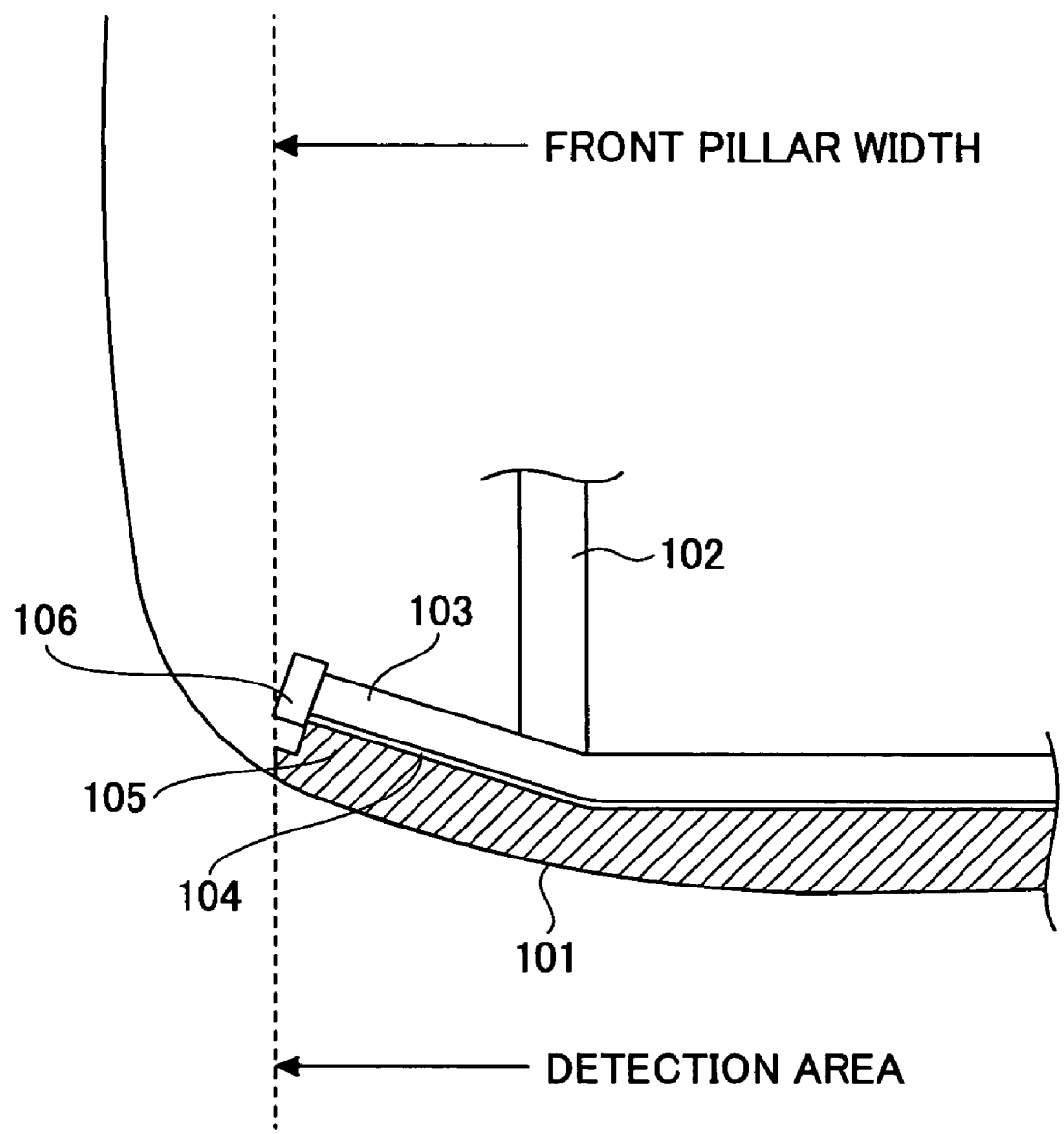
FIG. 4 is a partial enlarged view showing the details of a front bumper structure according to yet another embodiment of the present invention.

FIGS. 3 and 4 are embodiments that enable the sensor interface 106 to be provided further inside the vehicle without changing the collision detectable area by devising the shape of the shock absorber 105. In the embodiment shown in FIGS. 1 and 2, the side surfaces of the shock absorber 105 at its ends in the widthwise directions of the vehicle are substantially parallel to the front-rear directions of the vehicle. Meanwhile, in the embodiment shown in FIG. 3, the side surface of the shock absorber 105 at its end is substantially perpendicular to the collision detection sensor 104 (and the bumper reinforce 103 supporting it from the rear). As described above, a load applied to the bumper cover 101 is transmitted to the collision detection sensor 104 through the shock absorber 105. Therefore, by providing the shock absorber 105 over the front pillar width as shown in FIG. 3, a load applied to the bumper cover 101 within the front pillar width can be detected with the collision detection sensor 104. That is, according to the embodiment shown in FIG. 3, the length of the collision detection sensor 104 in the widthwise directions of the vehicle can be reduced without changing the area where a collision is detectable with the collision detection sensor 104, so that the sensor interface 106 can be more distant from the corner part of the front bumper.

FIG. 4 shows a specific example of a variation of the embodiment shown in FIG. 3, where the end shape of the shock absorber 105 is modified from that of FIG. 3 so as to transmit a load applied to the end part (corner part) of the shock absorber 105 to the collision detection sensor 104 with more certainty. That is, as shown in FIG. 4, the shape of the end part (in particular, corner part) of the shock absorber 105 is extended in the widthwise directions of the vehicle from that of FIG. 3, but a recess is provided on its rear surface in the front-rear directions of the vehicle so that a gap is formed between the shock absorber 105 and the sensor interface 106 in the front-rear directions of the vehicle in order that the shock absorber 105 may not come into contact with the sensor interface 106 even when a load is applied. By thus determining the shape, a load applied to the vicinity of the end part of the shock absorber 105 is transmitted to the collision detection sensor 104 with more certainty compared with the shape of FIG. 3.

Figure 5:
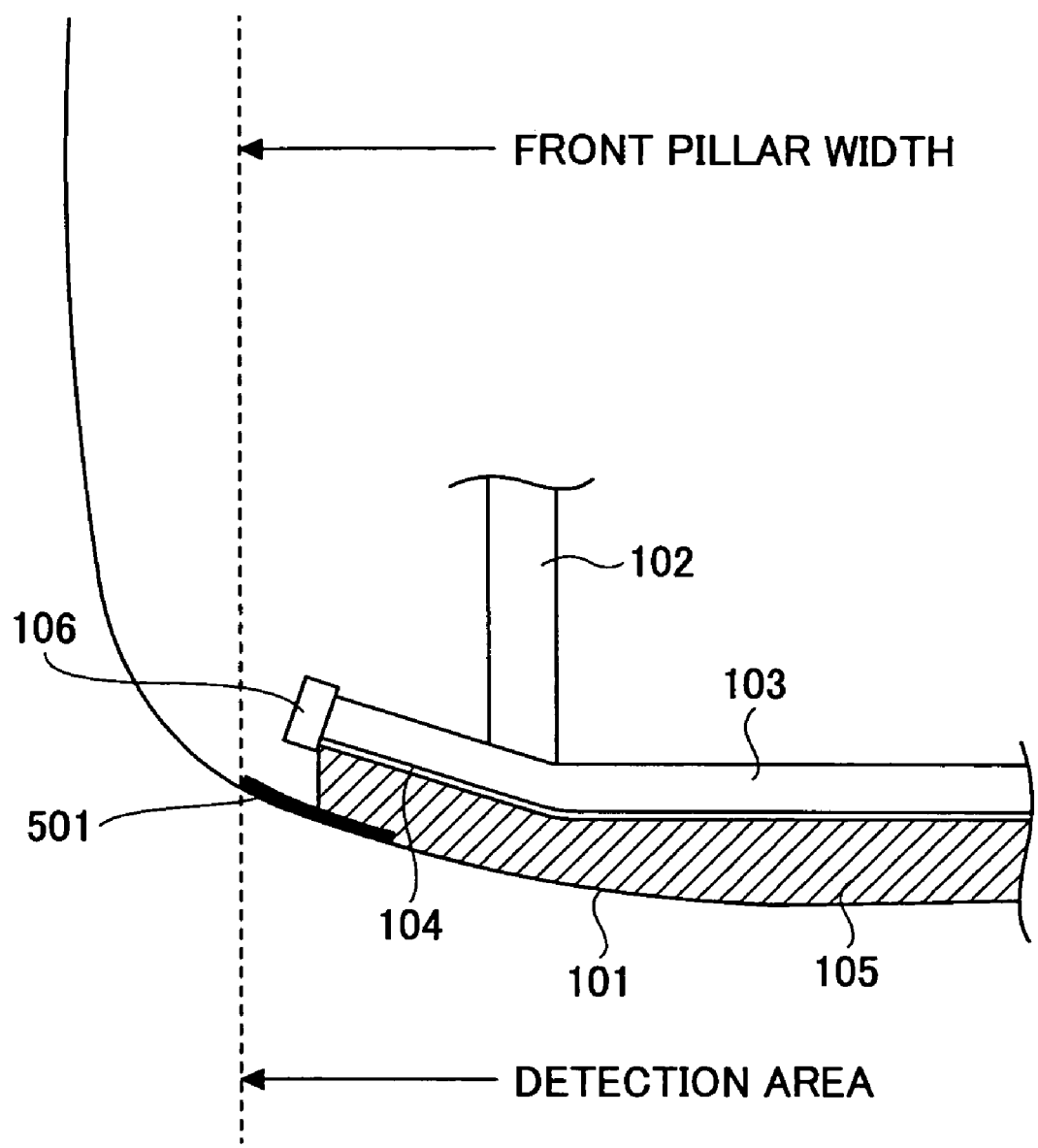
FIG. 5 is a partial enlarged view showing the details of a front bumper structure according to yet another embodiment of the present invention.

FIG. 5 is an embodiment that enables the sensor interface 106 to be provided further inside the vehicle without changing the collision detectable area by adding a plate member 501 that is a rigid body. The plate member 501 is provided so as to be sandwiched and fixed between the bumper cover 101 and the shock absorber 105 and to extend at least in an area where the shock absorber 105 is not provided within the range of the front pillar width of the bumper cover 101 as shown in FIG. 5. As a result, even if a load is applied to the area where the shock absorber 105 is not provided within the range of the front pillar width of the bumper cover 101, such a load can be transmitted to the shock absorber 105 through the plate member 501 that is a rigid body. Therefore, not only the collision detection sensor 104 but also the shock absorber 105 can be reduced in length in the widthwise directions of the vehicle.

Figure 6:
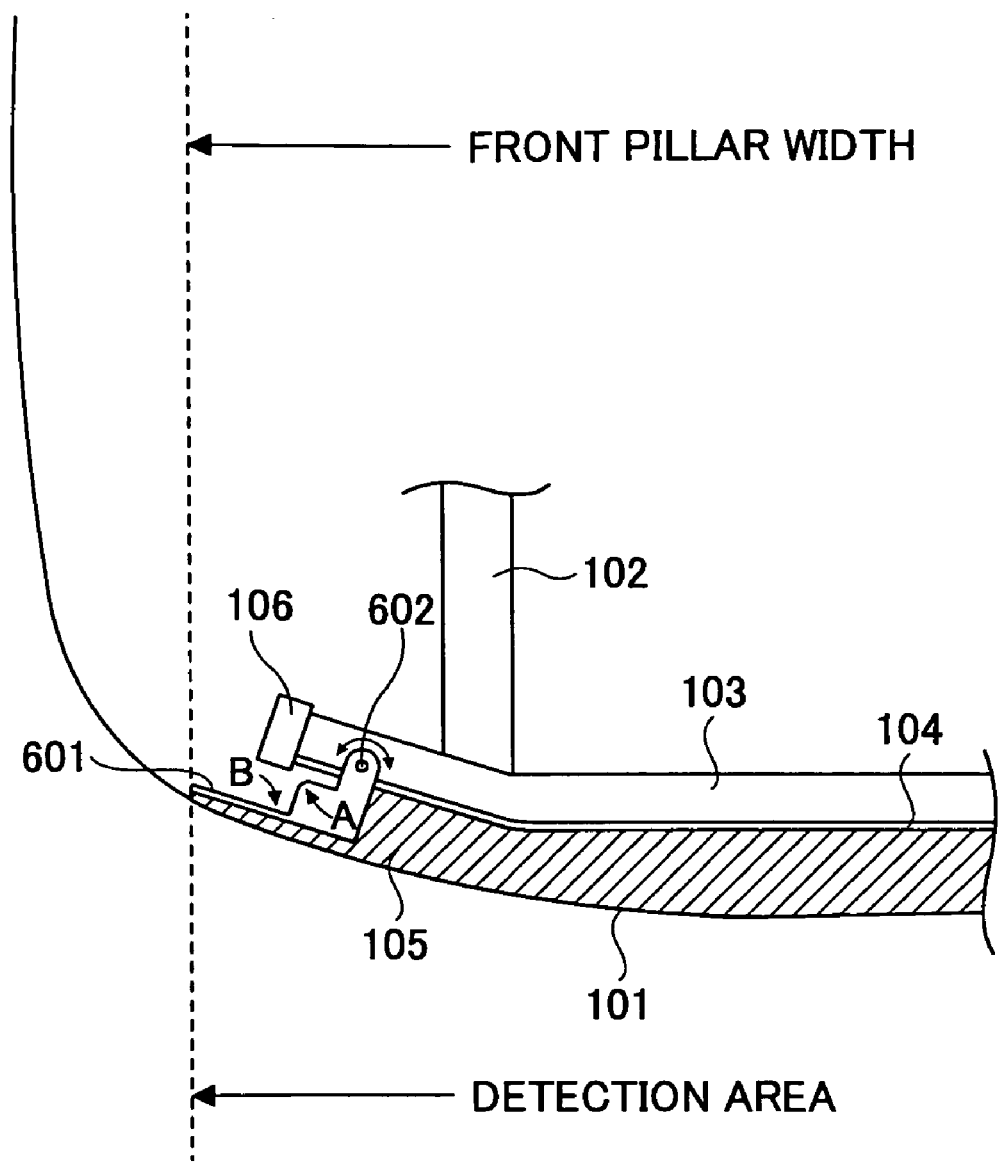
FIG. 6 is a partial enlarged view showing the details of a front bumper structure according to yet another embodiment of the present invention.

FIG. 6 is an embodiment that enables the sensor interface 106 to be provided further inside the vehicle without changing the collision detectable area by adding a lever member 601 that is also a rigid body in place of the plate member 501 (FIG. 5). The lever member 601, which is a rigid body, is attached to the bumper reinforce 103 so as to be swingable about a rotation shaft 60 substantially perpendicular to the ground. When a load is applied to part of the lever member 601 extending substantially parallel to the bumper cover 101, the lever member 601 rotates toward inside the vehicle about the shaft 602 so that a convex part A collides with the collision detection sensor 104 to transmit the load applied to the lever member 601 to the collision detection sensor 104. A recess B is provided so as to prevent the lever member 601 from coming into contact with the sensor interface 106, so that the load applied to the lever member 601 is not transmitted to the sensor interface 106. As a result, it is possible to further reduce the collision detection sensor 104 and the shock absorber 105 in length in the widthwise directions of the vehicle than in the embodiment shown in FIG. 5 while protecting the sensor interface 106.

Figure 7:
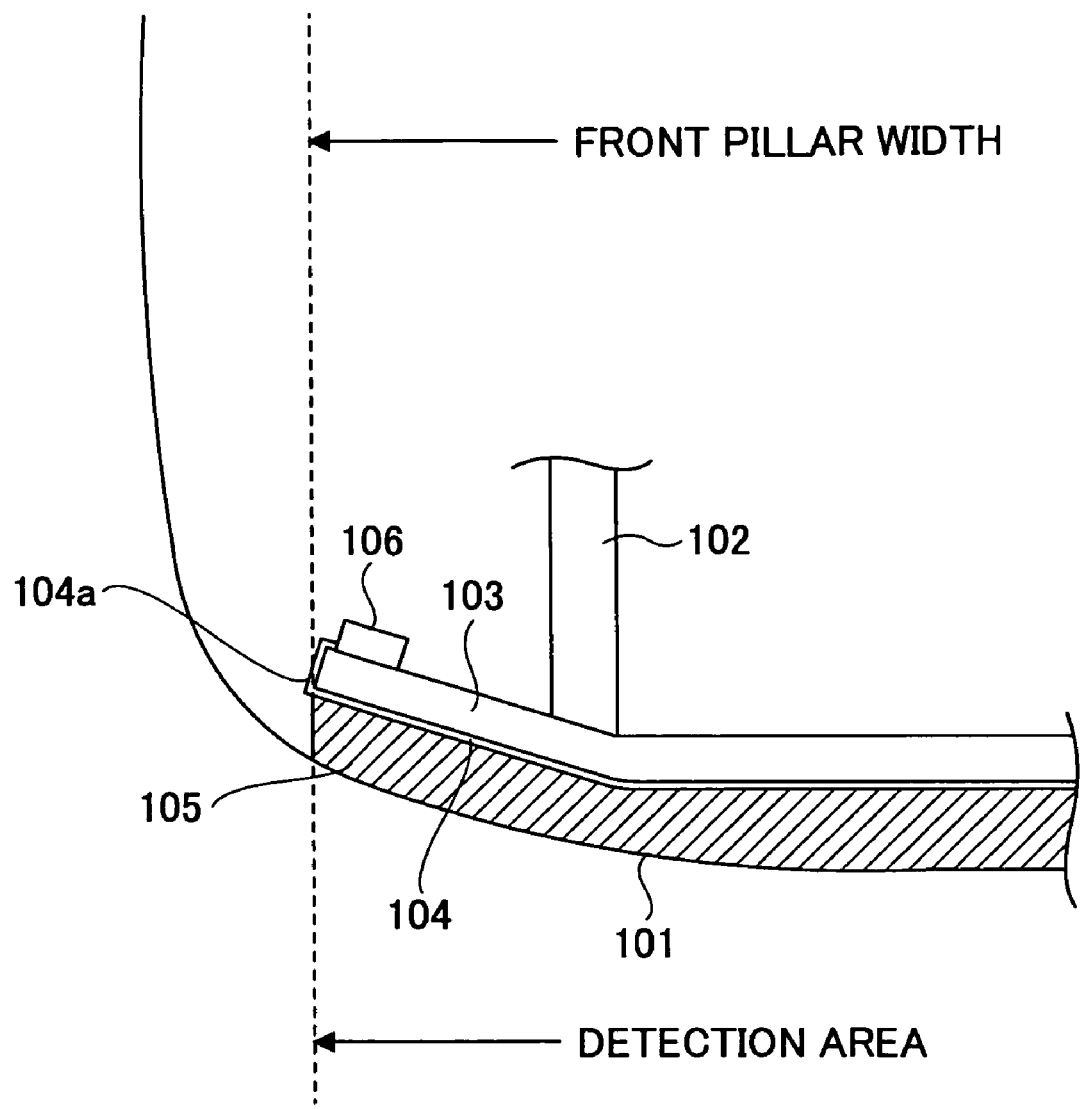
FIG. 7 is a partial enlarged view showing the details of a front bumper structure according to yet another embodiment of the present invention.

FIG. 7 is an embodiment where the sensor interface 106 is placed in the rear of the bumper reinforce 103 in the front-rear directions of the vehicle and the collision detection sensor 104 is extended so that an extension part 104a thereof along the side surface and the rear surface of the bumper reinforce 103 in the front-rear directions of the vehicle is connected to the sensor interface 106. As a result, the sensor interface 106 can be further away from the corner part of the front bumper. Therefore, even if a load is applied to the corner part of the front bumper because of a slight collision, it is possible to protect the sensor interface 106, thus increasing durability. In FIG. 7, by way of example, the extension part 104a of the collision detection sensor 104 is provided along the surface of the bumper reinforce 103. However, as is clear to a person having ordinary skill in the art, a groove or hole for providing the extension part 104a of the collision detection sensor 104 may be formed in the bumper reinforce 103 so as to prevent the extension part 104a of the collision detection sensor 104 from projecting from the bumper reinforce 103.

Figure 8:
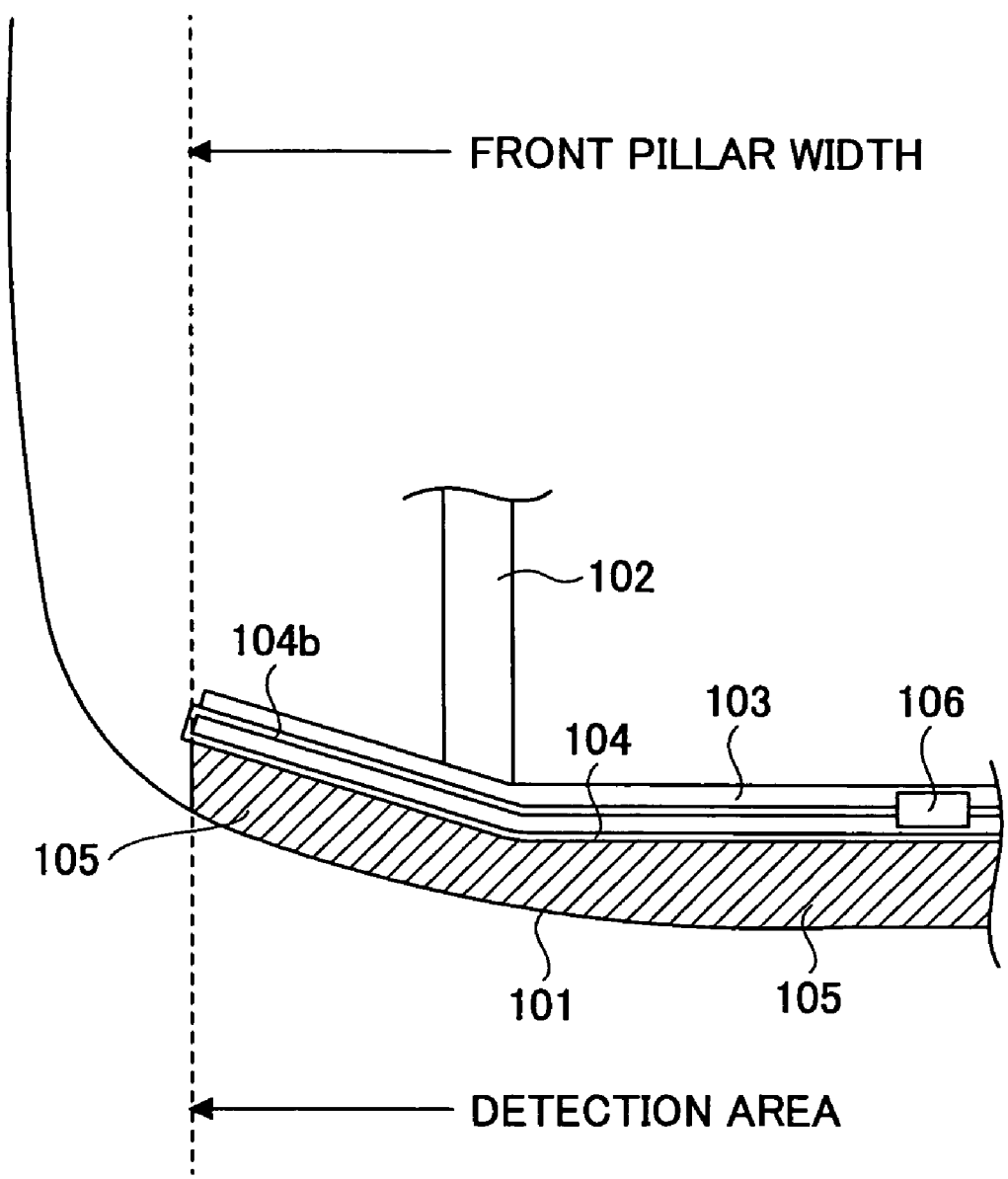
FIG. 8 is a partial enlarged view showing the details of a front bumper structure according to yet another embodiment of the present invention.

FIG. 8 is an embodiment where the sensor interface 106 is placed on the upper surface of the bumper reinforce 103 in the vertical directions of the vehicle and in the substantial center of the bumper reinforce 103 in the widthwise directions of the vehicle and the collision detection sensor 104 is further extended than in the embodiment shown in FIG. 7 so that an extension part 104b thereof along the side surface of the bumper reinforce 103 in the front-rear directions of the vehicle and along the upper surface of the bumper reinforce 103 in the vertical directions of the vehicle is connected to the sensor interface 106. As a result, the sensor interface 106 can be furthest away from the left and right corner parts of the front bumper. Therefore, it is possible to further increase the durability of the sensor interface 106. It is also possible in the embodiment shown in FIG. 8 to form a groove or hole for providing the extension part 104b of the collision detection sensor 104 in the bumper reinforce 103 so as to prevent the extension part 104b of the collision detection sensor 104 from projecting from the bumper reinforce 103 the same as in the case of FIG. 7.

Figure 9:
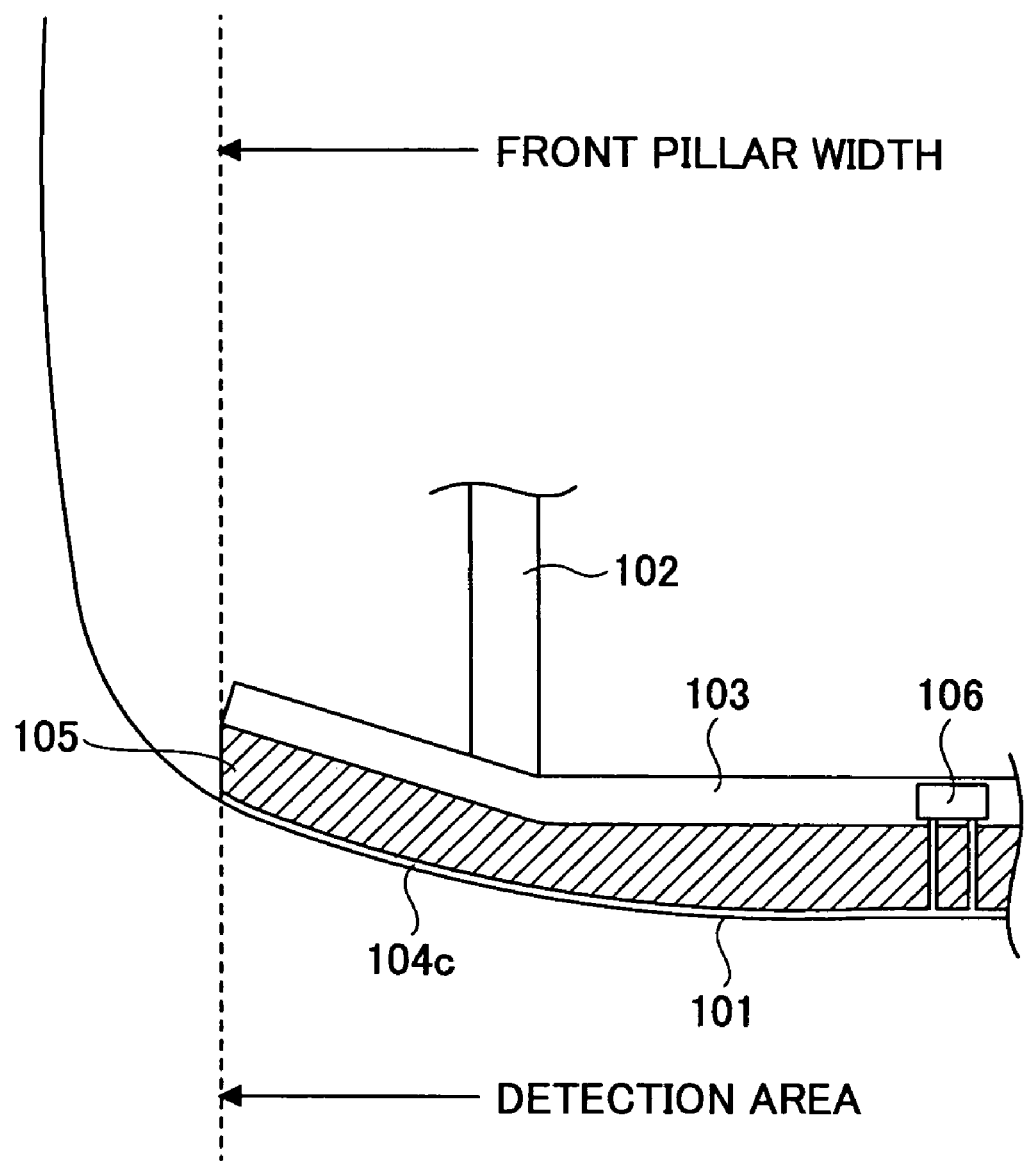
FIG. 9 is a partial enlarged view showing the details of a front bumper structure according to yet another embodiment of the present invention.

FIG. 9 shows an embodiment in the case of using a sensor 104c that measures a displacement, such as a displacement sensor, a touch sensor, or a capacitance sensor, as the collision detection sensor 104 in place of a load detection sensor or a pressure detection sensor using an optical fiber with the same sensor interface 106 placement as FIG. 8. Unlike the sensor detecting a load as shown in FIGS. 1 through 8, in the case of the sensor 104c measuring a displacement, the collision detection sensor 104c is provided in front of the shock absorber 105 in the vehicle as graphically represented. That is, in this embodiment, the collision detection sensor 104c is provided between the front bumper cover 101 and the shock absorber 105 so as to be connected through a groove or hole formed in the shock absorber 105 to the sensor interface 106 attached on the bumper reinforce 103 as graphically represented.

INDUSTRIAL APPLICABILITY

The present invention can be used for a front bumper structure with the function of detecting the collision of an object against the front bumper of a vehicle in the vehicle, irrespective of the appearance, weight, size, running performance, etc., of the vehicle.

The present application claims priority based on Japanese Patent Application No. 2005-258283, filed on Sep. 6, 2005, the entire contents of which are hereby incorporated by reference.

The invention claimed is:

1. A front bumper structure for a vehicle, comprising:
a front bumper having a bumper reinforce and a shock absorber; and
a collision detection sensor configured to detect a collision of an object against the front bumper, the collision detection sensor being provided to extend along the bumper reinforce between the bumper reinforce and the shock absorber,
wherein the collision detection sensor has an interface part positioned at a first end of the collision detection sensor in a widthwise direction of the vehicle, the first end being on a side of the collision detection sensor that is on a driver side of the vehicle, and
wherein a second end of the collision detection sensor in the widthwise direction of the vehicle has no interface part, the second end being on a side of the collision detection sensor that is on a passenger side of the vehicle.

2. The front bumper structure as claimed in claim 1, wherein a length of a front bumper area in the widthwise direction of the vehicle, in which area a load applied to the front bumper is detected with the collision detection sensor, is more than or equal to a maximum distance in the widthwise direction of the vehicle between points of contact of right and left front pillars of the vehicle with a hood thereof.

3. The front bumper structure as claimed in claim 2, wherein a first end of the bumper reinforce in the widthwise direction of the vehicle and the second end of the collision detection sensor in the widthwise direction of the vehicle extend more toward an outer side of the vehicle in a widthwise direction than a second end of the bumper reinforce in the widthwise direction of the vehicle and the first end of the collision detection sensor, respectively;
wherein the first end of the bumper reinforce is on the passenger side of the vehicle; and
wherein the second end of the bumper reinforce is on the driver side of the vehicle.

4. The front bumper structure as claimed in claim 2, wherein the collision detection sensor is a load sensor using an optical fiber.

5. The front bumper structure as claimed in claim 2, wherein the shock absorber is shaped so that a length in the widthwise direction of the vehicle of a front surface of the shock absorber in a front-rear direction of the vehicle is more than a length of the collision detection sensor in the widthwise direction of the vehicle.

6. The front bumper structure as claimed in claim 5, wherein the shock absorber is shaped so that the length in the widthwise direction of the vehicle of the front surface of the shock absorber in the front-rear direction of the vehicle is more than a length in the widthwise direction of the vehicle of a rear surface of the shock absorber in the front rear-directions of the vehicle.

7. The front bumper structure as claimed in claim 6, wherein the shock absorber is shaped so as to have a side surface at an end thereof substantially perpendicular to the collision detection sensor.

8. The front bumper structure as claimed in claim 6, wherein the shock absorber is shaped so as to have a recess provided on the rear surface thereof in the front-rear direction of the vehicle so that a gap is formed between the interface part of the collision detection sensor and the shock absorber.

9. The front bumper structure as claimed in claim 2, further comprising:
first load transmission means for transmitting a load to the shock absorber, the load being applied to an area where the shock absorber is not provided in the widthwise direction of the vehicle in a bumper cover of the front bumper.

10. The front bumper structure as claimed in claim 9, wherein the first load transmission means is implemented by increasing a rigidity of a part of the bumper cover which part is selected so that a portion of the part is in contact with the shock absorber and a remaining portion of the part is out of contact with the shock absorber.

11. The front bumper structure as claimed in claim 9, wherein the first load transmission means is implemented by attaching a highly rigid plate member between an inner side of the bumper cover and a front surface of the shock absorber in front-rear directions of the vehicle so that a part of the highly rigid plate member is in contact with the shock absorber and a remaining part of the highly rigid plate member is out of contact with the shock absorber.

12. The front bumper structure as claimed in claim 2, further comprising:
load transmission means for transmitting a load to the collision detection sensor, the load being applied to an area where the bumper reinforce and the collision detection sensor are not provided in the widthwise direction of the vehicle in the shock absorber,
wherein the shock absorber is extended to cover a range longer than a range where the bumper reinforce and the collision detection sensor extend in the widthwise direction of the vehicle.

13. The front bumper structure as claimed in claim 1, wherein a forward facing surface of the collision detection sensor contacts and is positioned behind a rearward-most facing surface of the shock absorber in a front-rear direction of the vehicle, and wherein a rearward facing surface of the collision detection sensor directly contacts and is positioned in front of a forward facing surface of the bumper reinforce in the front-rear direction of the vehicle.

14. The front bumper structure as claimed in claim 1, wherein the shock absorber comprises a foam material has a length extending in the widthwise direction of the vehicle, wherein the collision detection sensor is a load sensor comprising an optical fiber, and wherein the optical fiber extends substantially along the entire length of the shock absorber.

15. A front bumper structure for a vehicle, comprising:

a front bumper having a bumper reinforce and a shock absorber;

a collision detection sensor configured to detect a collision of an object against the front bumper, the collision detection sensor being provided to extend along the bumper reinforce between the bumper reinforce and the shock absorber; and load transmission means for transmitting a load to the collision detection sensor, the load being applied to an area where the bumper reinforce and the collision detection sensor are not provided in the widthwise direction of the vehicle in the shock absorber, wherein the collision detection sensor has an interface part positioned at a first end of the collision detection sensor in a widthwise direction of the vehicle, the first end being on a side of the collision detection sensor that is on a driver side of the vehicle, wherein a length of a front bumper area in the widthwise direction of the vehicle, in which area a load applied to the front bumper is detected with the collision detection sensor, is more than or equal to a maximum distance in the widthwise direction of the vehicle between points of contact of right and left front pillars of the vehicle with a hood thereof, wherein the shock absorber is extended to cover a range longer than a range where the bumper reinforce and the collision detection sensor extend in the widthwise direction of the vehicle, and wherein the load transmission means is implemented by a lever member swingably attached to the bumper reinforce so as to transmit a displacement of a part of the shock absorber to the collision detection sensor, the part being out of contact with the collision detection sensor.

* * * * *